June 7, 1938.     D. C. WAELES ET AL     2,119,836
BABY CARRIAGE FOLDABLE TO FORM TRUNKS
Filed Oct. 16, 1936     3 Sheets-Sheet 1

Inventors
Daniel Charles Waeles and
David Rozentraub
By B. Singer, atty.

June 7, 1938.  D. C. WAELES ET AL  2,119,836
BABY CARRIAGE FOLDABLE TO FORM TRUNKS
Filed Oct. 16, 1936  3 Sheets-Sheet 2
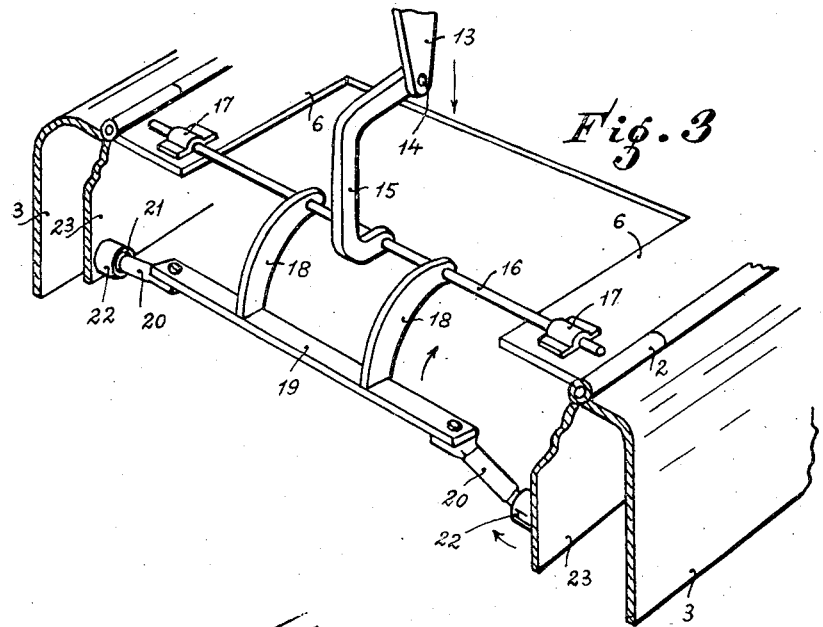
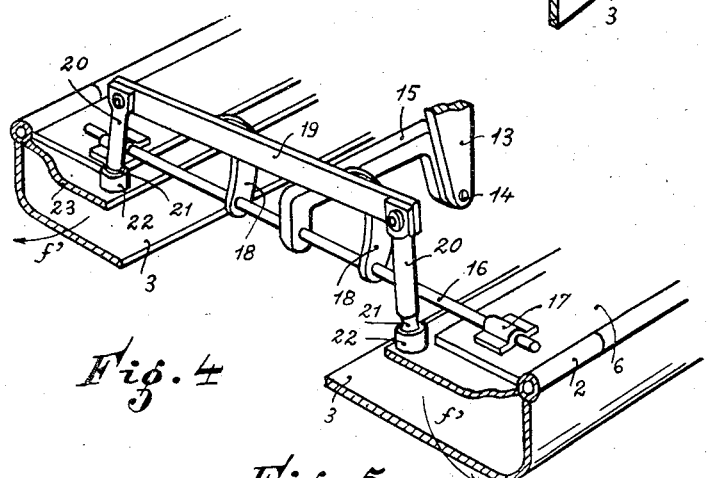
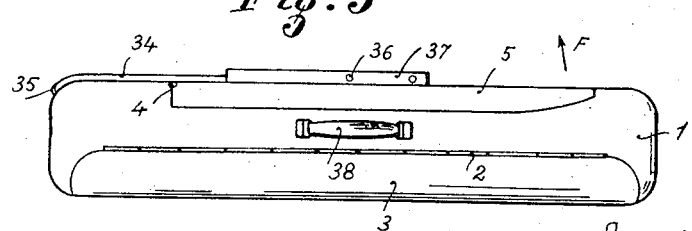

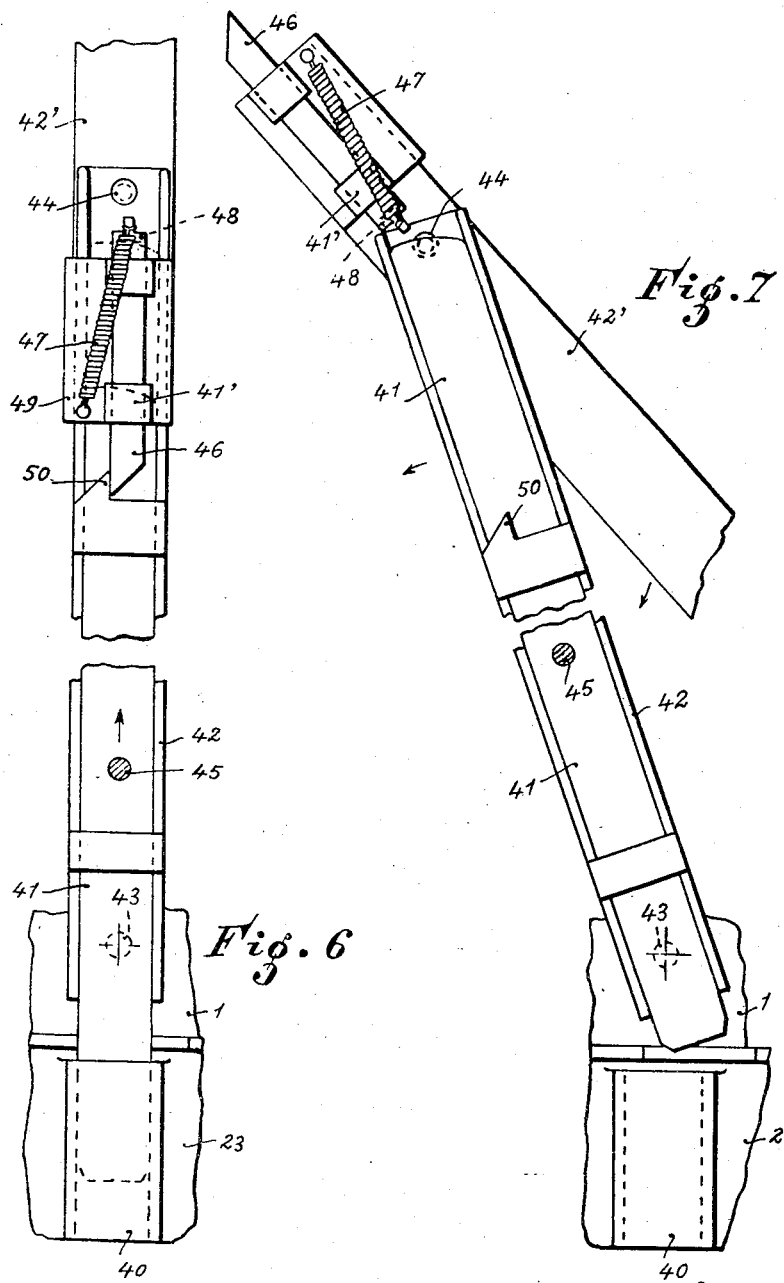

Patented June 7, 1938

2,119,836

UNITED STATES PATENT OFFICE 2,119,836

BABY CARRIAGE FOLDABLE TO FORM TRUNKS

Daniel Charles Waelès, Montreuil-sous-Bois, and David Rozentraub, Bagnolet, France Application October 16, 1936, Serial No. 106,022

7 Claims. (Cl. 280—37)

The present invention has for its object to provide improvements in baby carriages foldable to form trunks.

One of the features of the invention resides in that the unfolding of the carriage is effected simply by the opening of the trunk cover, this cover acting through the medium of the seat articulated to two lateral wings containing cheeks carrying the wheels. On unfolding these wheels automatically assume a vertical position at each side of the carriage case, whilst on folding together the carriage they are automatically placed beneath the case so as to close, partially, the trunk.

Another feature resides in the means connecting the seat to the wheel cheeks and constituting itself a bracing device between these cheeks on opening the carriage.

A further feature consists in a system for double fastening of the cheeks in their open positions, the first fastening means acting on the cover and the second on the guiding bar or handle; this second fastening means serving to secure, simultaneously, the wheel-cheeks and the guiding bar in the working position.

Other objects will in part be obvious and in part be generally pointed out hereinafter.

To the attainment of the aforesaid objects and ends the invention still further resides in those novel details of construction, combination and arrangement of parts, all of which will be first fully described in the following detailed description, then be pointed out in the appended claims, reference being had to the accompanying drawings, in which:—

Fig. 3 shows means establishing connection between the seat and the wheel cheeks, in the position of travel;

Fig. 4 shows these connection means in the position where the carriage is folded together;

Fig. 5 represents the carriage folded together in the form of a trunk;

Fig. 6 illustrates the means for fastening the cheeks and the guiding bar in the working position, and Fig. 7 represents the same device at the moment of unfastening.

Figure 1:
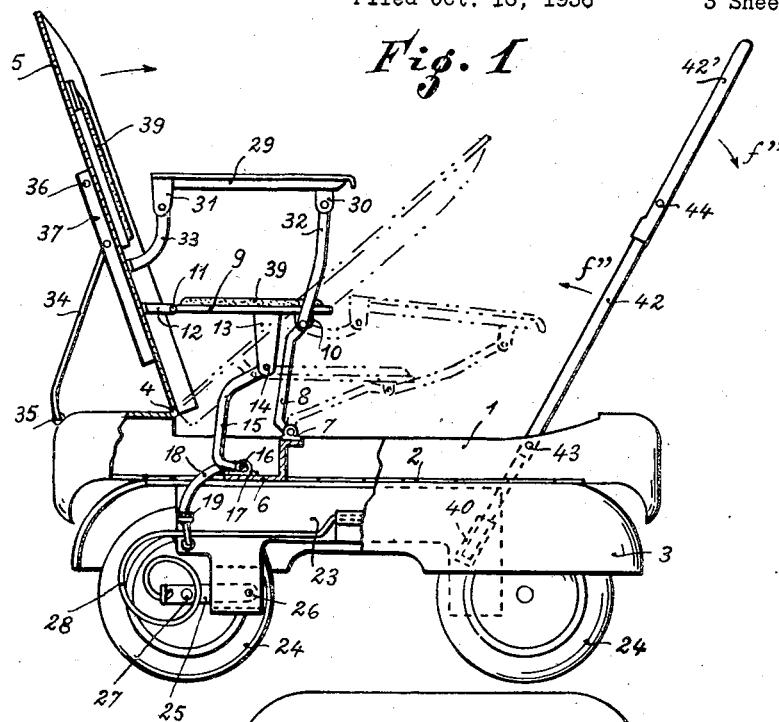
Fig. 1 shows the baby carriage in its working position, some parts being represented in section.
Figure 2:
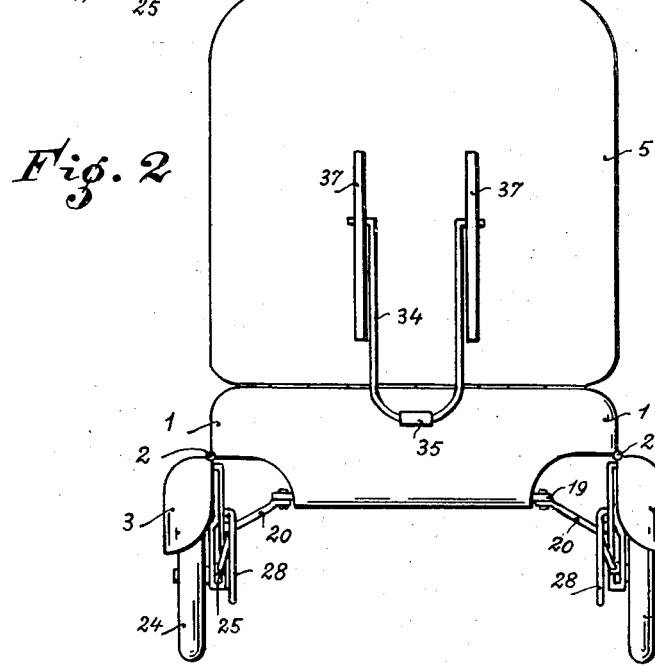
Fig. 2 is a rear view of this carriage in its working position.

The carriage according to the invention is constituted in the following way:

To a frame 1 (Fig. 1) which forms the base of the carriage and at the same time the lateral walls of the trunk, are articulated, by means of hinges 2, two wings 3 in the shape of shells and serving to form, after folding up, parts which serve as partial closures for the lower opening of the trunk.

A panel 5 is hinged at 4 to the frame 1 and forms the back of the seat and at the same time the cover for closing totally the upper opening of the trunk after folding up of the carriage.

To the lateral walls of the frame 1 is fixed a cross bar 6 constituted to support members 7 serving as articulation points for two links 8 destined to carry the seat 9 through the medium of members 10 fixed to the seat.

The seat 9 is articulated at 11 to two brackets 12 attached to the back 5.

To the lower side of the seat 9 is attached a leg 13 and at 14 is articulated to the same, one of the extremities of a cranked link 15 which is fixed, with its other extremity to a shaft 16 journalled in small bearings 17 supported by the cross bar 6.

To the shaft 16 are keyed two cranked arms 18 rigidly connected to a transverse rod 19 (Fig. 3), to two extremities of which are articulated two links 20 terminated by swivel joints 21. These swivel joints engage bushes 22 fixed on the inner walls of flanges 23 integral with the wings 3.

To each one of these flanges and disposed laterally in the interior of the wings 3 at both sides of the carriage, are fixed two wheels 24 through the medium of a suspension device adopted by the builder.

In Fig. 1, this device comprises, for each wheel, a lever 25 articulated at 26 to the flange 23 and carrying the axle 27 of the wheel 24.

A spiral spring 28 or a spring blade or any other elastic means is connected to the extremity of the lever 25 and ensures elasticity of the carriage suspension.

The seat 9 is provided with two arm supports 29 (Fig. 1) and each one of them is supported, at one part, by means of a projection 30, by a link 32 articulated to the member 10 of the seat, and, at the other part, by means of a projection 31, by a cranked bracket 33 fixed to the back forming the cover.

This back is maintained in its opened position by means of an arched arm 34 articulated at 35 to the frame 1 of the carriage, the shanks of this arm forming springs engaging with their extremities holes 36 provided in two parallel irons 37 fixed to the back 5.

The working of the whole device is as follows:

As shown in Fig. 5, the carriage presents itself in its closed position in the shape of a trunk easily transportable owing to the provision of a handle 38.

The upper part of the trunk is completely closed by the back part 5 whereas the lower part is partially shut by the two folded down wings 3. The central longitudinal portion may be closed by a wing or a cloth or be left open, especially if the trunk is enclosed in a sheath.

When it is desired to use the carriage, it suffices to place the trunk flatwise on the ground and to raise the cover 5 in the direction of the arrow f in Fig. 5.

The cover swings on its hinges and places itself then in the position shown in Fig. 1.

Simultaneously the cover takes along, by its brackets 12, the seat 9 and by the brackets 33 the arm-supports 29.

Consequently, the seat 9 and the arm supports 29 are brought into their useful position and the cover 5 forms the back of the seat.

The back as well as the seat and also the arm-supports may be garnished by an appropriate bolstering (not shown).

On being lifted the seat 9 acts by the bracket 13 on the link 15 (Fig. 4) and hence on the shaft 16 controlling the upright setting of the wheels.

Upon rotation of this shaft its two arms 18 act upon the two links 20 which, in their turn move back the two flanges 23 in the direction of the arrows f' shown in Fig. 4.

These flanges thus move with the wings 3 around their axles 2 and place themselves in the vertical positions shown in Fig. 3, as are consequently the wheels 24, and the carriage is ready for the drive. The arm 34 maintains the back in a suitable inclination.

In order to secure good working, the different described parts ought to satisfy exact conditions, complied with by the invention and constituting its essential features.

First of all, the links 20 ought to be disposed in such manner that when the carriage is open they are located, as shown in Fig. 3, in the same vertical plane as the transverse rod 19 and form with the same a straight cross-piece apt to maintain rigidly the distance between the flanges 23 so as to prevent their accidental folding together into their closed position.

In order to avoid every accident of this kind, the flanges are also fastened in their vertical position by means of the following device.

To each flange is fixed, or otherwise provided thereon, a sheath 40 (Figs. 1 and 6) into which is inserted a latch 41 sliding in the interior of a shank situated in the first part 42 of the guiding bar.

This guiding bar is articulated at 43 to the frame 1 of the carriage and forms, owing to a second articulation 44 two parts 42, 42' so as to permit folding of this bar in the direction of the arrows f" in Fig. 1.

The two latches 41 have the advantage of maintaining the guiding bar and at the same time flanges 23 rigidly in place.

The latches are operated simultaneously owing to a cross bar 45 connecting them and which can be acted upon by hand so as to shift the latches in one or the other direction according as to whether the guiding bar is to be bolted or unbolted.

The extremities of the latches 41 (Figs. 6 and 7) are constituted to act, when unbolting the handle and the flanges, upon bolts 46 actuated by springs 47 and maintaining in known manner the two parts 42, 42' of the handle in their aligned position, and which close themselves automatically when unfolding the handle or guiding bar.

For this purpose the extremities 41' of the latches 41 are slanted so as to act upon a peg 48 fixed to the bolt as shown in dotted lines in Fig. 6.

The bolt is supported by a U-like piece 49 fixed to the part 42' of the handle and serving as abutment of this part on the part 42 after rotation in the direction of opening. At this moment the bolt 46 engages a latch 50 fixed on the part 42.

On raising the latch 41 by means of the cross-bar 45 this latch leaves the sheath 40 of the flange 3 and abuts with its extremity 41' against the peg 48 of the bolt 46 whereby the part 42' is liberated and permits the part 42 to be turned over as shown in Fig. 7.

Another condition for good working of the whole resides in the shape and position of the brackets 33 of the arm-supports. These brackets ought to be disposed on the back below the level of the arm-supports (Fig. 1) so as to permit the latter, when the carriage is folded together, to be located below the cover without surpassing the same and preventing the closing. This condition explains the cranked form of the brackets 33 and their fixation at a level inferior to the one of the arm-supports.

The folding together of the carriage is effected with the same simplicity as its unfolding. After unbolting the handle by simple action on the cross-bar 45 and folding the handle into the case it suffices to press on the two shanks of the arm 34 so as to liberate the back and to place the same into the case so that the links 20 act by traction upon the flanges 23 and so that the wings 3, integral with them, are folded so as to close anew the trunk as shown in Fig. 5.

What we claim, is:

1. A foldable baby carriage which can be converted into a trunk, comprising a frame forming the base of the carriage and also the case of the trunk, a cover which constitutes the back rest of a seat pivoted on said cover, two pivoted longitudinal side flanges pivoted on the two long sides of the said frame, two wheels carried by each of said side flanges, and means for connecting the said seat to the said flanges so that the opening of the cover simultaneously causes the unfolding of the seat and the down folding of the flanges on the longitudinal axis of the box towards the edges, and so that the vehicle might be unfolded for the service upon the opening of the lid, the seat being inversely folded and the two flanges being turned back into the box to form the cases for the trunk, there being wings directed towards the longitudinal axis of the trunk.

2. A baby carriage foldable to the form of a trunk, comprising a frame constituting the base of the vehicle and the case of the trunk, a lid which forms the back rest of a seat, which seat is pivoted to said lid, two longitudinal side flanges pivoted on the long sides of the vehicle frames, two wheels carried by each of said side flanges, and means for connecting the said seat with the said flanges, so that the opening of the lid induces simultaneously the unfolding of the seat and the down folding of the longitudinal flanges towards the edges while the closure of the lid induces the folding down of the seat and the return of the longitudinal flanges into said case, the said means comprising a rod pivoted beneath the seat and connected with a shaft, the said shaft being provided with two cranks which carry a transverse bar, two rods being pivoted to the ends of the said bar, swivel joints at the end of the said rods, bushes fixed on the side flanges for receiving the said joints and for transmitting to the said flanges the movements for unfolding or folding them which are imparted to them by the back rest, through the intermediary of the said seat.

3. A baby carriage foldable to the form of a trunk, comprising a frame constituting the base of the vehicle and the casing of the trunk, a lid which forms the back rest of a seat, which seat is pivoted to said lid, two longitudinal side flanges pivoted on the long sides of the vehicle frames, two wheels carried by each of said side flanges, and means for connecting the said seat with the said flanges, so that the opening of the lid induces simultaneously the unfolding of the seat and the down folding of the longitudinal flanges towards the edges while the closure of the lid induces the folding down of the seat and the return of the longitudinal flanges into said case, the said means comprising a rod pivoted beneath the seat and connected with a shaft, the said shaft being provided with two cranks which carry a transverse bar, two rods being pivoted to the ends of the said bar, swivel joints at the end of the said rods, bushes fixed on the side flanges for receiving the said joints and for transmitting to the said flanges the movements for unfolding and folding them which are imparted to them by the back rest, through the intermediary of the said seat, the said transverse bar and the said pivoted rods at the end of the bar being disposed to position themselves in approximately the same vertical plane upon the unfolding of the vehicle so as to form a rigid brace rectilinearly between the two longitudinal flanges adapted to maintain the latter rigidly in vertical position.

4. A foldable baby carriage adapted to be folded in the form of a trunk, including a frame forming the base of the vehicle and the body of the trunk, a lid constituting the back rest of a seat pivoted on the said lid, two longitudinal flanges pivoted on the long sides of the said frame, and means for connecting said seat with said flange so that the opening of the lid induces simultaneously the positioning of the seat to operative location and the unfolding of the flanges, while the closure of the lid induces the folding down of the seat and the in-turning movement of the flanges into the trunk, a U-shaped guiding bar, arms which are pivoted on the base of the vehicle, a locking bolt slidable on the lower portion of each of said arms, a sheath fixed on each longitudinal flange in alignment with the arms of the guiding bar, each of said sheaths receiving the locking bolt of the arm of the guiding bar pertaining thereto when the said bolt is slid towards the lower end of the arm, so as to fix the guiding bar and the flanges corresponding to each arm of the said guiding bar in the opening position of the vehicle.

5. A baby carriage foldable to the form of a trunk, including a frame forming the base of the vehicle and the body of the trunk, a lid forming the back rest of a seat pivoted on said lid, two longitudinal flanges hinged on the longitudinal sides of the said frame, means for connecting the said seat with said flanges so that the opening of the lid induces simultaneously the unfolding of the seat and the swinging movement of said flanges downwardly and outwardly on their hinges while the closure of the lid induces the folding down of the seat and the inward and upward movement of the flanges into the frame, a U-shaped member the arms of which are pivoted on the frame of the vehicle, a locking bolt slidable on the lower portion of each of said arms, a sheath fixed on each lateral flange in alignment with the arms of said U-shaped guiding bar and disposed so that each sheath can receive the locking bolt of the pertaining arm of said guiding bar when the said bolt is slid towards the bottom of the arm in order to maintain rigidly said guiding bar as well as said flanges in open position, the two arms of the guiding bar being formed, each by two sections pivotally connected with one another so as to permit the guiding bar to be folded into the frame of the vehicle at the time that the latter is folded together, a spring latch on each arm in order to maintain automatically the two sections of the arm in alignment with each other when the guiding bar is unfolded, the upper end of the locking bolt which slides on each arm having means to open the latch when said locking bolt is slid towards the top so as to proceed with the folding of the vehicle.

6. A baby carriage foldable to the form of a trunk, including a frame forming the base of the vehicle and the body of the trunk, a lid forming the back rest of a seat pivoted on said lid, two longitudinal flanges pivoted along the longitudinal sides of the frame, and means for connecting the said seat with said flanges in such manner that the opening of the lid will induce simultaneously the unfolding of the seat and the downward and outward movement of the flanges while the closure of the lid will induce the folding down of the seat and the turning inward and upward of the flanges into the frame, a U-shaped guiding bar, the arms of which are pivoted on the frame of the vehicle, a locking bolt slidable in the lower portion of each of said arms, a sheath fixed on each lateral flange in alignment with the arms of the guiding bar, each of said sheaths receiving the locking bolt of the adjacent arm of the guiding bar when the said bolt is slid towards the bottom of the arm so as to rigidly lock at the same time the guiding bar and the flange corresponding to each arm of said guiding bar in the open position, the two arms of the guiding bar being each formed of two sections pivoted to one another so as to permit the guiding bar to be folded into the frame of the vehicle at the same time the latter is folded down, a spring latch on each arm to maintain automatically the two sections which compose the arm in alignment with each other upon unfolding of the guiding bar, the upper end of the locking bolt which slides in each arm being arranged to open the latch when the said bolt is caused to slide upwardly so as to proceed with the folding of the vehicle, and a transverse part connecting the two bolts which slide in the arms of the guiding bar so as to assure simultaneous manipulation of the two bolts.

7. A baby carriage foldable to the form of a trunk, including a frame constituting the base of the vehicle and the body of the trunk, a lid forming the back rest of a seat pivoted on said lid, two longitudinal flanges pivoted on each of the long sides of said frame, two wheels carried by each flange, and means for connecting the said seat with said flanges so that the opening of the lid will induce simultaneously the unfolding of the seat and the turning outward of the flanges about their longitudinal axes towards the sides of the frame, while the closure of the lid will induce the folding down of the seat and the inward movement of the flanges into the frame, two wings with longitudinal flanges to partly hide the wheels and serve as mudguards during the use of the vehicle and to partially close the lower opening of the frame when the vehicle is folded into trunk shape.

DANIEL CHARLES WAELÈS.
DAVID ROZENTRAUB.